May 13, 1941.                L. KAMENAROVIC                2,241,724
                             MANIPULATING KNOB
                            Filed Feb. 25, 1939

Inventor:
L. Kamenarovic
By C. F. Wenderoth
   atty

Patented May 13, 1941

2,241,724

UNITED STATES PATENT OFFICE 2,241,724

MANIPULATING KNOB

Leone Kamenarović, Milan, Italy, assignor to Fabbrica Italiana Magneti Marelli Soc. An., Milan, Italy, a corporation of Italy Application February 25, 1939, Serial No. 258,535
In Italy March 10, 1938

1 Claim. (Cl. 287—53)

Manipulating knobs are known for the control of movable parts of electric apparatus, radio-receivers, metering apparatus and the like, which include a grasping member of insulating material, as thermoplastic material (say that known under the registered trade-mark Bakelite and the like); in said knobs said grasping member is provided with a bore for being located over a spindle it is intended to control as well as with a transverse screw threaded hole in which a screw is screwed to firmly engage said grasping member on said spindle.

The knobs of the above stated class, particularly when the end of the cooperating spindle is not provided with a cotter or key for angular interengagement of the knob with the spindle, are subject to the objection that said screw is required to carry out an exceedingly heavy action to make the knob solid with the spindle and consequently the screw thread provided in the grasping member material or also said grasping member often breaks.

This invention is directed to a knob in which the above stated objection is removed and the screw threaded hole for the clamping screw is provided in a metal plate freely located in the bore of the knob neck intended to be engaged over the spindle or in a seat provided therein.

By this arrangement it is not longer necessary to rely on a thread made in insulating material which is necessarily brittle, and a very satisfactory angular engagement is secured of said knob and spindle, while the tensile stresses induced in the knob material by the action developed by the said screw and plate over the internal surface of the knob neck are resisted by the whole material providing said neck; further said neck is reinforced by a metal ring embedded in the front face of the knob neck which encircles the knob neck bore.

Figure 1:
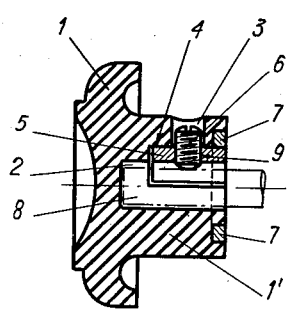
Figure 2:
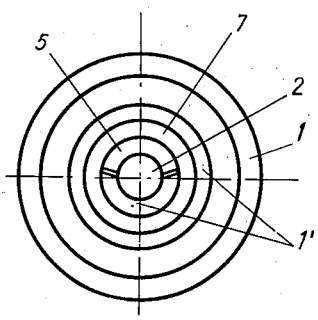

An embodiment of this invention is shown by way of example on the annexed drawing and Figure 1 is a central section of said knob, Figure 2 is a rear view thereof.

The knob in accordance with this invention includes a head 1 having any preferred shape from which a neck 1' extends; an axially extending bore 2 and a hole 3 transverse thereto are provided in said neck, the bore 2 being intended to receive the end of a spindle 8 shown in dotted lines to be actuated by said knob while the hole 3 opens in the bore 2 and is intended to enclose a set screw as 6 adapted to clamp the said knob 1, 1' on the spindle 8.

In accordance with this invention the internal surface of the bore 2 in the neck 1' has a longitudinal recess or seat 4 in register with the transverse hole 3 and a metal plate 5 is loosely located within said recess or seat; said plate 5 has a screw threaded hole 9 throughout it in register with the neck hole 3 and the set screw 6 is screwed in said hole 9 and extends in the hole 3.

By screwing the screw 6 down through the hole 9 in the plate 5, said screw 6 is caused to abut on the spindle 8 and it tends to force the plate 5 towards outside, said plate 5 being thus firmly engaged in the seat or recess 4 and providing a satisfactory angular interconnection of the knob 1, 1' and spindle 8.

To reinforce the material of the knob neck 1' which encircles the bore 2 thereof, a metal ring 7 is located in the transverse or front face of the knob neck; said ring 7 may be embedded in the insulating material providing the knob 1 and neck 1' at the time it is moulded.

The internal surface of the plate 5 and possibly also the surface of the bore 2 of the knob neck 1' or of a portion thereof, is cylindrical.

What I claim as my invention and desire to secure by United States Letters Patent is:

A device of the character described for controlling a spindle comprising a manipulating knob provided with a knob neck having a bore for location on said spindle and a longitudinal seat in the internal surface of said bore with a transverse hole opening therein, a metal plate loosely located in said seat and having a screw threaded hole through it in register with said neck transverse hole, a metal ring embedded in said knob neck and encircling said bore and seat thereof and providing an external abutment for said metal plate, and a set screw for interconnecting said plate, knob and spindle, said screw being screwed in the screw threaded hole of said plate and being loose in said neck transverse hole.

LEONE KAMENAROVIĆ.